United States Patent [19]
Baerveldt

[11] Patent Number: 5,130,176
[45] Date of Patent: Jul. 14, 1992

[54] JOINT SEALANT

[76] Inventor: Konrad Baerveldt, 5 Rosea Court, Thornhill, Ontario, Canada, L3T 2V3

[21] Appl. No.: 553,725

[22] Filed: Jul. 16, 1990

[30] Foreign Application Priority Data

Aug. 8, 1989 [CA] Canada .................................. 607804

[51] Int. Cl.$^5$ ............................................. B32B 23/02
[52] U.S. Cl. .................................... 428/192; 428/218; 428/306.6; 428/308.4; 428/314.4; 428/316.6; 428/317.1; 428/322.7
[58] Field of Search ............... 428/306.6, 308.4, 314.4, 428/316.6, 317.1, 322.7, 57, 58, 192, 218; 52/309.6, 396, 404, 573

[56] References Cited
U.S. PATENT DOCUMENTS 4,977,018 12/1990 Irrgeher et al. .................. 428/316.6

OTHER PUBLICATIONS

Emseal PD$_{K-S}$ System: Brochure by Emseal Corporation dated Mar., 1986.
SPEC-DATA 7p "Joint Sealers" by Emseal Corporation dated May, 1984.

Primary Examiner—Bruce H. Hess
Assistant Examiner—Elizabeth Evans
Attorney, Agent, or Firm—Anthony J. Casella; Gerald E. Hespos

[57] ABSTRACT

A sealant strip includes at least three layers of foam coated on one side edge with a waterproof elastomer. The strip is arranged as two outer layers sandwiching an inner layer. The outer layers are substantially equally compressible, and the inner layer is compressible to a different degree than the outer layers. When the outer edge of said strip is coated with said elastomer and then said strip compressed, said coating will tend to fold along the interfaces between the layers of foam.

5 Claims, 1 Drawing Sheet

JOINT SEALANT

The present invention relates to the field of joint sealants.

In particular, the present invention relates to a joint sealant manufactured from compressed foam. A form of compressed foam joint sealant is shown in applicant's co-pending Canadian patent application no. 535,854, filed Apr. 28, 1987. That patent application relates to a sealant strip made from two layers of foam, each layer being a lateral margin of a foam strip folded 180° about its longitudinal axis. Such a sealant strip is preferably made from compressible open celled foam which has been impregnated with adhesive, and coated on its outer surface with a waterproof elastomeric layer. That outer surface bridges the two layers of foam and is curved in a fan shape.

It will be appreciated, therefore, that the outer surface of the sealant strip described in applicant's said co-pending Canadian patent application will be convexly curved when the sealant strip is applied in joint. This is acceptable in quite a few applications, and desirable in some applications, but where it is desired that a joint be completely sealed, but the sealant strip not be convex relative to the joint, then the strip of Canadian patent application no. 535,854 will not be applied.

In view of the foregoing, it will be understood that there exists a need for a sealant strip which will seal a joint, such as a joint between building panels in a curtain wall construction, but which will not be convex relative to the joint, and will present a smooth, or slightly concave surface. It is especially desired to produce a sealant strip with a substantially flat or otherwise unobtrusive surface in a fairly wide joint.

The present invention, in fulfilling the above mentioned objects, provides a sealant strip which presents substantially flat outer surface when applied in a joint. Such sealant strips have been attempted before, but it has been found to be difficult or impossible to apply an outer sealant coating which could be relied upon to consistently present a smooth surface. This was because if the foam inner portion of a sealant strip was coated with elastomer and then compressed, the elastomeric coating would ripple unpredictably and then, when permitted to expand, expand unpredictably, pulling some ripples out and not others. In addition, if the impregnated foam inner portion was coated with elastomer, *continuous* adhesion of the elastomer to the impregnated foam would exist across the face of the joint. This continuous adhesion could inhibit the desirable elongation characteristics of the membrane. The present invention overcomes these significant disadvantages, by providing a sealant strip with a membrane which, when the sealant strip is compressed, folds uniformly. Accordingly, as the strip decompresses, the membrane will unfold smoothly.

In a broad aspect, the present invention relates to a sealant strip including at least three layers of foam coated on one side edge with a waterproof elastomer, arranged as two outer layers sandwiching an inner layer, the outer layers being substantially equally compressible, and the inner layer being compressible to a different degree than the outer layers, whereby when the outer edge of said strip is coated with said elastomer and then said strip compressed, said coating will tend to fold along the interfaces between the layers of foam.

In another broad aspect, the present invention relates to a method of making a sealant strip comprising the steps of: i) providing a sandwich construction of at least three layers of foam, the outer layers of said sandwich being foam layers of substantially equal compressibility, and the inner layer being a layer of foam of different compressibility; ii) coating an edge of said sandwich construction with a waterproof elastomeric material; iii) compressing said sandwich construction.

The compressed sandwich may be bound with, for instance, shrink wrap plastic film, so that the sealant strip may be delivered to a job sight in a precompressed state. Also, it will be noted that in a most preferred embodiment, the sandwich construction of foam is partially compressed before the elastomeric material is applied. The degree to which the construction is compressed prior to coating will depend upon the width of the joint it is intended for. Generally, the sandwich constructions is compressed to a width just wider than the joint for which it is intended, so that the applied elastomer will be wide enough to completely cover the joint in its maximum expanded condition.

In drawings which illustrate the present invention by way of example:

Figure 1:
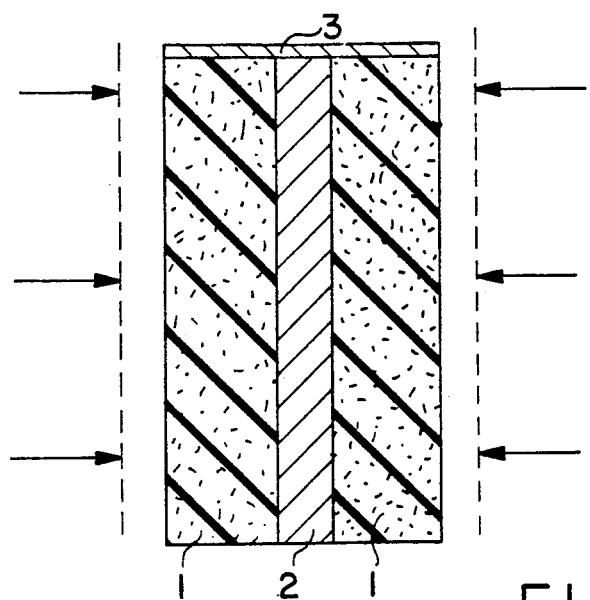
FIG. 1 is an end view of a sandwich construction of foam layers, partially compressed, and with a layer of elastomer applied to an edge thereof.

Referring first to FIG. 1, the sealant strip of the present invention is constructed as a sandwich which, in the basic form illustrated in FIG. 1, is a sandwich of two outer layers of open celled, adhesive impregnated foam 1 and an inner layer of closed cell foam 2.

The sandwich has an uncompressed thickness which is substantially greater than the thickness shown in FIG. 1, when elastomeric layer 3 is applied. The original thickness is shown, for exemplary purposes, by the dotted lines in FIG. 1. The compressed thickness shown in FIG. 1, when the elastomeric topcoat is applied, will in fact be in the range of about 40% to about 60% of the uncompressed thickness of the sandwich. The precise thickness to which the sandwich is compressed will depend on the width of the joint the strip will be installed in. Because joints have a maximum expansion and contraction which is less or greater than their mean measured width under normal conditions, and it is desired that the elastomeric top layer 3 completely cover the joint under any foreseeable circumstances, the layer 3 should be applied with the sandwich of foam layers 1, 2, 1 compressed to a thickness just greater than the maximum width i.e. extension of the joint in which the strip will be applied.

Figure 2:
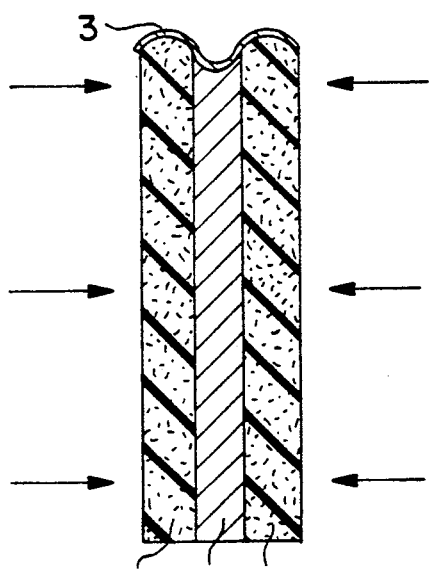
FIG. 2 is an end view of the construction of FIG. 1 under final compression before packaging.

The strip is held in the partially compressed state of FIG. 1 until the topcoat 3 cures, and then it is compressed to its packaged width. At full compression, which is shown in FIG. 2, the open celled foam layers 1 will be about from 10% to about 25% of their uncompressed thickness. Closed cell foam 2 will not be a substantially different thickness, though, because of the resistance to compression shown by closed cell foams.

Referring again to FIG. 2, it will be seen that because of the difference in compressibility of the foam layers of the sandwich, the open celled foam tends to bridge outwardly at the interfaces between layers. This creates the desirable effect of a uniform fold in the elastomeric coating 3 running the length of the strip, at each interface. This folding of the coating 3 takes up all available slack in the coating 3 and limits random ripples in the coating 3. Moreover, when the strip is installed and allowed to expand to about the width shown in FIG. 1, the topcoat will be pulled out to its uncompressed, unfolded width, and it will present a relatively smooth surface. Slight convex curvature may be visible where the coating was folded out by the open celled foam layers bulging out, but this is architecturally acceptable in most situations.

After the sandwich construction of FIG. 2 has been compressed, release paper is applied to its outer surfaces and a stiff material, like masonite, is placed on each side. Shrink wrap plastic tubing is then drawn over the compressed strip, and treated to shrink, usually by heat or irradiation. For use, the shrink wrapper is slit, the masonite discarded, the release paper peeled off and the sealant sandwich placed in the joint to be sealed, which may be pre-treated to adhere well with the adhesive which has been impregnated into foam layers 1. If desired, a pressure sensitive adhesive may be applied onto the outside surface of open celled foam layers 1. The strip is placed by hand against one surface of the joint; and allowed to expand to fill the joint, which it will be naturally as it decompresses due to the resiliency of foam 1.

Suitable elastomeric topcoats 3 would include silicone rubber compounds available from Dow Corning Canada under the trade mark DOW 790 TM. These compounds will penetrate slightly the outer surface of impregnated foam 1 so that upon curing they will anchor the waterproof membrane securely to the foam layer 1. Moreover, it will be noted that these silicone compounds are colourable and hold colour well. Also, they cure to a fairly smooth, aesthetically appealing outer finish. Alternatively, it will be understood that other elastomeric membranes may be bonded to the outer surface of the impregnated foam.

It will be noted that several types of elastomeric compounds will be suitable for use in forming the waterproof membrane 3. These include normal R.T.V. (room temperature vulcanizing) silicone rubbers, polyurethanes, acrylics, vinyls, synthetic and natural rubbers, polysulphides, thermo-plastics, thermo-rubbers, polymers and copolymers of the foregoing, and so — on as will be obvious to one skilled in the art. The most important features of the waterproof membrane chosen will be water impermeability, the ability to be bonded to the outer surface layers of the open celled foam, so as to display elastic properties equivalent to those of the open-celled impregnated foam (in the context of its use). Preferably the membrane will weather well, and will be colourable or pre-coloured and colour-stable.

Adhesive impregnated foam layer 1 is made of a flexible, open-celled foam with good ability to recover its shape and size after compression. Examples of those which have been found to be particularly fit for the purposes of the present invention are polyurethane, amongst other synthetic open-celled foam materials. Other suitable open-celled foams — such as those utilizing polyvinyl copolymers, natural or synthetic rubber, or viscose sponge — will be obvious to the skilled practitioner. Commercial examples of foams found to be suitable are "polyester foam Grade 6273" (Source: General Foam Corporation, Paramus, N.J., U.S.A.). A commercially available impregnated foam which has been found suitable for use in the present invention is GREYFLEX. available from Emseal Corporation, Mississauga, Ontario.

As noted above, the open-celled foam layer 1 is impregnated with adhesive. This is generally in the ratio of between 1:4 to 1:5 foam to adhesive by weight. The correct quantity of adhesive to be used in conjunction with a particular foam will be a matter of design choice for the skilled workman. The parameters which must be considered include adhesive density (i.e. specific gravity) and viscosity, apparent foam density, cell count of the foam, elasticity of the foam, indentation force deflection of the foam, air permeability of the foam and chemical compatibility of the foam with the chosen adhesive. However, this ratio may be increased or decreased, depending on relative impregnated foam weight and the final degree of compression required to increase the density of the product to the density necessary to obtain weathertight characteristics. Too much adhesive will tend to lead to bleeding of the adhesive from the foam upon compression at elevated temperatures. Conversely, it will lead to low recovery and loss of elasticity at reduced temperature. The adhesive chosen should be one that in its cured state continues to exhibit elastic and adhesive properties. Suitable adhesives are chlorinated paraffin waxes, natural and synthetic waxes, acrylics, latexes, styrenes, vinyls, bitumens (asphalts), natural and synthetic resins, and copolymers of the foregoing.

Closed cell foam layer 2 may be made of one of many resilient flexible, inexpensive materials, such as polyethylene or ethyl vinyl acetate foam. Other suitable core materials, such as cellular, flexible, plastic extrusions will be apparent to the skilled practitioner.

Figure 3:
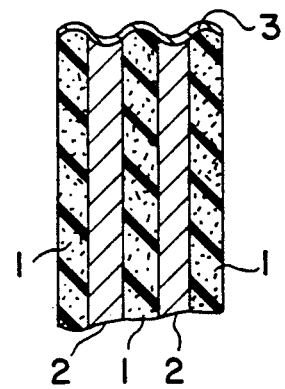
FIG. 3 is a view of an alternate embodiment of the present invention under final compression before packaging.

Referring to FIG. 3, it will be seen that more than three layers of foam may be used. The key is to ensure that adjacent layers have different compressibilities, so that when the sandwich is compressed, the elastomeric membrane will fold uniformly at the interface between layers. It has been found that alternating layers of open celled and closed-celled foam, as shown in FIG. 3, is an advantageous embodiment of the present invention.

It is to be understood that the examples described above are not meant to limit the scope of the present invention. It is expected that numerous variants will be obvious to the person skilled in the field of sealant design and manufacture, without any departure from the spirit of the present invention. The appended claims, properly construed, form the only limitation upon the scope of the present invention.

I claim:

1. A sealant strip including at least three layers of foam arranged as two outer layers formed from an open cell foam impregnated with adhesive and at least one inner layer formed from a closed cell foam, the outer layers being substantially equally compressible, and the inner layer being less compressible than the outer layers, one edge of said strip being coated with a waterproof elastomer and said strip being compressed, such that said coating is folded along interfaces between the layers of foam.

2. A sealant strip as claimed in claim 1, including an odd number of said layers greater than three, with alternating layers being said open cell foam impregnated with adhesive and with layers intermediate the open cell foam being said closed cell foam.

3. A sealant strip as claimed in claim 2, wherein said open celled foam is chosen from the group including polyurethane, polyvinyl copolymers, natural or synthetic rubbers and viscose sponges.

4. A sealant strip as claimed in claim 3, wherein said elastomeric compound is selected from the group including RTV vulcanizing silicone rubbers, polyurethanes, acrylics, vinyls, synthetic and natural rubbers, polysulphates, thermo-plastics, thermo-rubber and polymers and copolymers of the foregoing.

5. A sealant strip as claimed in claim 3, wherein said adhesive is selected from the group including chlorinated paraffin waxes, natural and synthetic waxes, acrylics, latexes, styrenes, vinyls, bitumens, natural and synthetic resins, and copolymers of the foregoing.

* * * * *